No. 858,114. PATENTED JUNE 25, 1907.
W. H. SNEED.
HARNESS.
APPLICATION FILED AUG. 23, 1906.
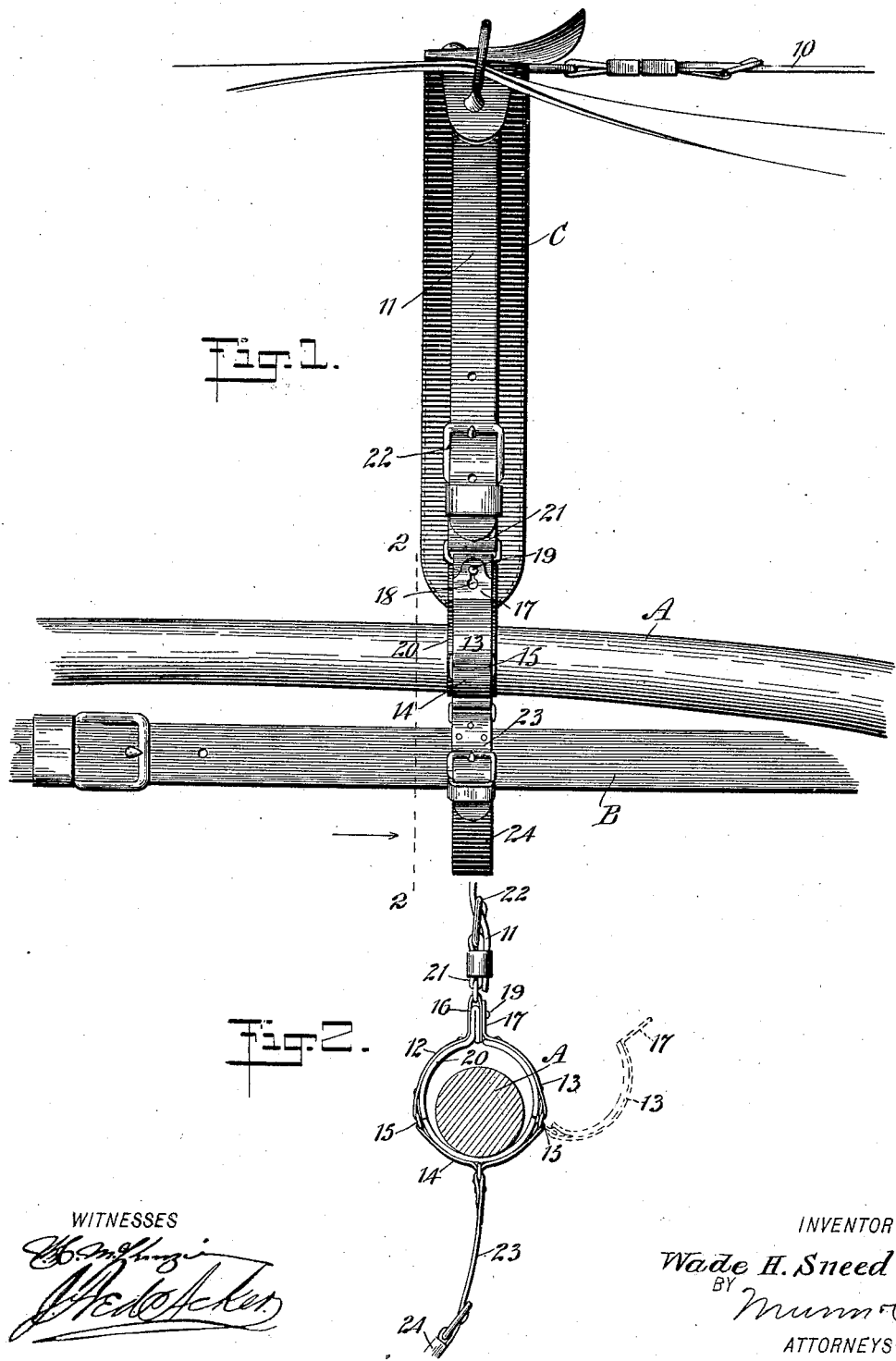
WITNESSES
INVENTOR
Wade H. Sneed
BY
Munn & Co
ATTORNEYS

UNITED STATES PATENT OFFICE.

WADE HAMPTON SNEED, OF PENSACOLA, FLORIDA.

HARNESS.

No. 858,114.      Specification of Letters Patent.      Patented June 25, 1907.

Application filed August 23, 1906. Serial No. 331,729.

*To all whom it may concern:*

Be it known that I, WADE HAMPTON SNEED, a citizen of the United States, and a resident of Pensacola, in the county of Escambia and State of Florida, have invented a new and useful Improvement in Harness, of which the following is a full, clear, and exact description.

My invention relates to an improvement in harness, and the purpose of said invention is to provide shaft-supporting collars, or shaft holders for vehicles, adapted for attachment to the saddle strap, so constructed that in harnessing a horse to a buggy, for example, it is simply necessary to raise a shaft and snap the holder thereon, thereby greatly facilitating the work, since the necessity of backing the animal to a determined position between the shafts is not necessary.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a side elevation of a saddle and its attachments, a portion of the shaft and trace and a side elevation of the holder applied to the shaft and saddle; and Fig. 2 is a transverse section through the shaft and an edge view of the improved holder or collar.

A represents a portion of a shaft of a vehicle and B a portion of the trace of a harness. C represents the saddle-band, which is shown provided with the usual back strap 10 and carrying straps 11 extending down at its sides. The improved support is best shown in Fig. 2, and is in the form of a collar, being preferably made of metal, and it comprises three sections, two upper sections 12 and 13 and a lower section 14, the upper sections being hinged to the lower section as shown at 15 in the drawings, so that said sections may be readily dropped down or be opened to receive within the structure the shaft A to which the collar or support is adapted.

The diameter of the collar or support is greater than the diameter of the shaft as is indicated in Fig. 2; and one of the upper sections, the upper section 12, for example, is provided at its upper end with an upwardly-extending vertical loop 16, which occupies a central position at the upper portion of the collar; and the opposing upper side section 13 is provided with a lip 17, adapted when the said section 13 is closed to lie against the loop 16 and be secured thereto, which is accomplished preferably by producing a keyhole slot 18 in the lip to receive a pin 19, extending out from the collar. The metal body of the collar or shaft support is usually provided with a lining 20 of leather or a like material, adapted to the sections of said collar. A strap 21 is attached to the loop 16, and the said strap is provided with a buckle 22, whereby to attach the collar to an end of the carrying strap 11 of the harness saddle C. A billet 23 is loosely connected with the central portion of the lower section 14 of the said shaft collar, and the billets 23 of opposing shaft collars are connected by a shaft band 24 of any approved construction, whereby to prevent the shafts from working upward.

This device is exceedingly simple, it is durable and economic, and renders it very easy to harness an animal to a buggy or a like vehicle, since by opening up the shaft collars it is only necessary to raise the shafts and drop them in the collars, and then snap said collars closed.

Having thus described my invention, I claim as new, and desire to secure by Letters Patent,—

A shaft collar, comprising a lower section and upper sections hinged to the ends of the lower section, one of said upper sections having at the free end thereof an open loop, the outer side of said loop being provided with a pin, the other of said upper sections being provided with a lip having a key hole slot for engagement by the pin, a billet connected with the lower section, and a strap connected with the loop, said sections being lined with leather for the purpose set forth.

In testimony whereof I have signed my name to this specification in the presence of two subscribing witnesses.

WADE HAMPTON SNEED.

Witnesses:
    J. N. ANDREWS,
    GEO. W. CARPENTER.